United States Patent
McLaughlin

(10) Patent No.: US 11,513,186 B2
(45) Date of Patent: Nov. 29, 2022

(54) PARALLEL CORRELATION THREADS FOR RADAR SIGNAL PROCESSING

(71) Applicant: Rockwell Collins, Inc., Cedar Rapids, IA (US)

(72) Inventor: Clint W. McLaughlin, Allen, TX (US)

(73) Assignee: Rockwell Collins, Inc., Cedar Rapids, IA (US)

(*) Notice: Subject to any disclaimer, the term of this patent is extended or adjusted under 35 U.S.C. 154(b) by 163 days.

(21) Appl. No.: 16/736,538

(22) Filed: Jan. 7, 2020

(65) Prior Publication Data
US 2021/0208241 A1 Jul. 8, 2021

(51) Int. Cl.
*G01S 7/295* (2006.01)

(52) U.S. Cl.
CPC .................. *G01S 7/295* (2013.01)

(58) Field of Classification Search
None
See application file for complete search history.

(56) References Cited

U.S. PATENT DOCUMENTS

| | | |
|---|---|---|
| 5,477,227 A | 12/1995 | Noneman |
| 5,563,806 A | 10/1996 | Barry et al. |
| 5,583,505 A * | 12/1996 | Andersen ............... G01S 7/021 342/40 |
| 6,985,102 B1 | 1/2006 | Horn et al. |
| 7,397,415 B1 | 7/2008 | Wang et al. |
| 7,965,226 B2 * | 6/2011 | Krikorian ............... G01S 13/22 342/131 |
| 8,138,969 B2 | 3/2012 | Huggett et al. |
| 8,587,468 B2 | 11/2013 | Card et al. |
| 9,954,561 B2 | 4/2018 | Ray et al. |
| 9,991,908 B2 | 6/2018 | Ray |
| 2010/0019498 A1 | 1/2010 | Newham et al. |
| 2014/0149803 A1 * | 5/2014 | Lehofer ............. H04L 41/0631 714/47.1 |

OTHER PUBLICATIONS

Extended Search Report for European Application No. 21150566.4 dated Jun. 4, 2021, 7 pages.

* cited by examiner

*Primary Examiner* — Whitney Moore
(74) *Attorney, Agent, or Firm* — Suiter Swantz pc llo

(57) ABSTRACT

A system may include a computing device including a processor. The processor may be configured to: for correlation threads having populated queues, execute at least some of the correlation threads in parallel, wherein execution of each of the at least some of the correlation threads results in at least one of: at least one new radar track or at least one updated existing radar track; and output each new radar track and each updated existing radar track.

16 Claims, 17 Drawing Sheets

PARALLEL CORRELATION THREADS FOR RADAR SIGNAL PROCESSING

BACKGROUND

Radar warning receiver (RWR), electronic support measures (ESM), and electronic intelligence (ELINT) systems are designed to capture parameters from active radar signals in the environment. Traditionally, radar pulse receivers capture radar signals and produce digital representations of the pulse data. This data is often referred to as pulse descriptor words (PDWs). PDW data is sent to hardware executing software algorithms which attempt to separate, identify and report on the existence of unique radar signals within the data itself.

In dense modern signal environments, radar receivers collect and send a substantial amount of PDW data to software applications. Traditionally, this represents the greatest challenge to data processing post receiver hardware. To mitigate the issue, pulse sorting algorithms may utilize data reduction techniques to prevent malfunction and feed data to the deinterleaving algorithms.

Even though the amount of data generated by radar receivers can be substantial, the narrow bandwidths on pulse receiving hardware act as a natural limit on the number of signals generated from the incoming PDW data. This has effectively limited the number of signals being sent through signal correlation. However, digital radar detection bandwidths are widening over time and as they widen, the amount of signals produced by deinterleaving algorithms will also increase.

Signal correlation represents a stage of radar detection processing which attempts to discern unique instances of like signals in the environment. Existing signal correlation algorithms are well-known to those of skill in the art. Traditionally, the algorithm that performs this processing has not been a significant drain on computer processing power. However, digital radar pulse processing hardware bandwidths are increasing. At the same time, signal density across the spectrum is also increasing.

SUMMARY

In one aspect, embodiments of the inventive concepts disclosed herein are directed to a system. The system may include a computing device including a processor. The processor may be configured to: receive radar detection reports, each radar detection report having a type identification (ID) indicative of a type of radar associated with a given signal detection; for each of the radar detection reports, determine if said radar detection report has a particular type ID associated with a particular existing correlation thread for processing particular radar detection reports having the particular type ID; for each of first radar detection reports determined to have a matching type ID associated with a matching existing correlation thread, add said first radar detection report to a queue of said matching existing correlation thread; for each of second radar detection reports determined not to have an associated existing correlation thread, create a new correlation thread and add said second radar detection report to a queue of said new correlation thread; for correlation threads having populated queues, execute at least some of the correlation threads in parallel, wherein execution of each of the at least some of the correlation threads results in at least one of: at least one new radar track or at least one updated existing radar track; and output each new radar track and each updated existing radar track.

In a further aspect, embodiments of the inventive concepts disclosed herein are directed to a method. The method may include: receiving, by at least one processor, radar detection reports, each radar detection report having a type identification (ID) indicative of a type of radar associated with a given signal detection; for each of the radar detection reports, determining, by the at least one processor, if said radar detection report has a particular type ID associated with a particular existing correlation thread for processing particular radar detection reports having the particular type ID; for each of first radar detection reports determined to have a matching type ID associated with a matching existing correlation thread, adding, by the at least one processor, said first radar detection report to a queue of said matching existing correlation thread; for each of second radar detection reports determined not to have an associated existing correlation thread, creating, by the at least one processor, a new correlation thread and add said second radar detection report to a queue of said new correlation thread; for correlation threads having populated queues, executing, by the at least one processor, at least some of the correlation threads in parallel, wherein execution of each of the at least some of the correlation threads results in at least one of at least one new radar track or at least one updated existing radar track; and outputting, by the at least one processor, each new radar track and each updated existing radar track.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
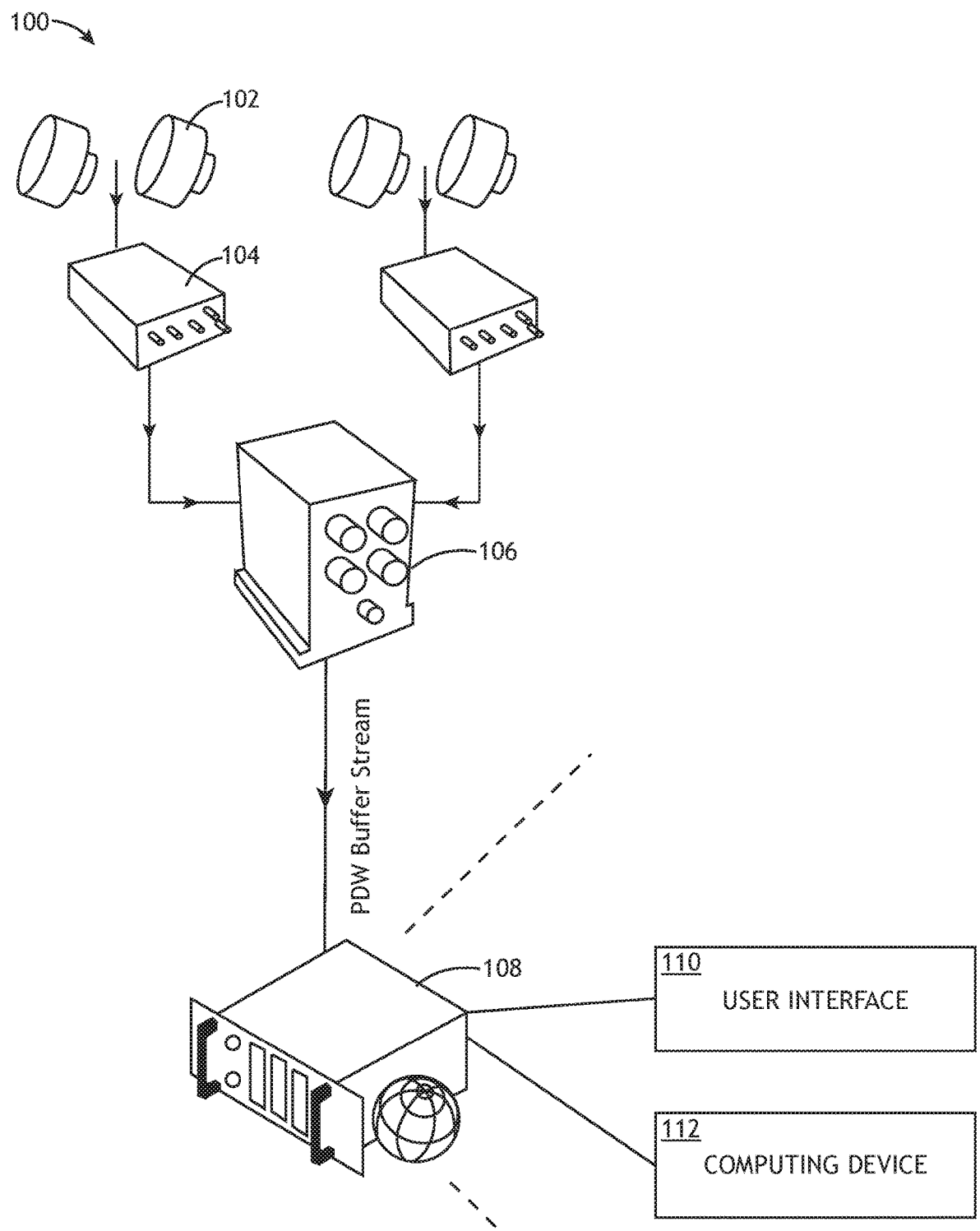
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to perform signal correlation utilizing parallel processing. For example, signal correlation may be performed in parallel by using type identifications (IDs) (e.g., unique radar classification IDs) and known existing data structures. In some embodiments, signal correlation may utilize parallel processing to keep up with ever increasing data and modern signal reporting requirements.

Some embodiments may include signal correlation queues, which may utilize type IDs for radar library or radar classifications to effectively pre-sort incoming signal detections into individual correlation threads. These correlation threads can independently and efficiently compare incoming signals (and/or radar detection reports indicative of the received incoming signal) against a fixed list (e.g., a sub-list) of existing tracks (e.g., tracked signals) to determine if an arriving signal is a new threat or a repeat detection of an existing threat. Some embodiments of the correlation queues and correlation threads allow for efficient performance of correlation operations. In some embodiments, correlation can be run in parallel and correlation threads do not have to continually search and retrieve potential matching signals from a larger track list; for example, each correlation thread can limit the search and retrieval of potential matching signals to a sub-list of existing tracks that have a same type ID as the incoming signal.

As used throughout, an individual PDW describes a radar pulse in terms of frequency, amplitude, pulse duration and time of intercept. Frequently other information is included, such as angle of arrival of the radar pulse and modulation flags noticed on the radar pulse.

As used throughout, signal deinterleaving may refer to separating out PDW data into individual buffers that each belong to a single radar. When data is collected, the radar pulses (e.g., PDWs) are interleaved within a PDW buffer. The deinterleaver attempts to separate out the PDW data into individual buffers that each belong to a single radar.

As used throughout, signal identification may refer to an emitter that has been matched to a type of radar that exists in the environment. Identification utilizes a library of predefined signals with known specific parameters.

As used throughout, signal classification may refer to an emitter whose generic type has been inferred from analysis of the behavior of the emitter in the data against a pre-programmed or learned set of radar behaviors (e.g. search radar, tracking radar, surface-to-air missile (SAM) radar, etc.). Classification does not necessarily require a defined library of emitters, but may employ a list or defined rules for radar behavior.

As used throughout, detection may refer to a signal that has been detected from within pulse data and will be reported on. (E.g., a deinterleaver may take PDW data as an input and produce one or more signal "detections" as an output.)

As used throughout, track may refer to a unique signal in the environment that has been identified, reported, and possibly geolocated. A detection becomes a track once it has been correlated and reported.

As used throughout, type ID may refer to a unique ID directly assigned to a specific identification or classification that can be associated with a signal detection. A type ID is indicative of a type of radar. For example, a type ID may refer to a specific make and model of radar.

Figure 2:
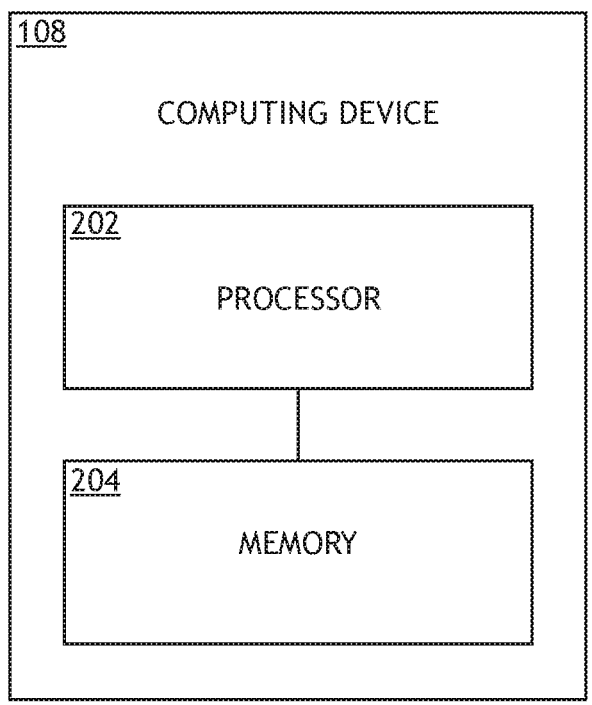
FIG. 2 is a view of an exemplary embodiment of the computing device of FIG. 1 according to the inventive concepts disclosed herein.
Figure 3:
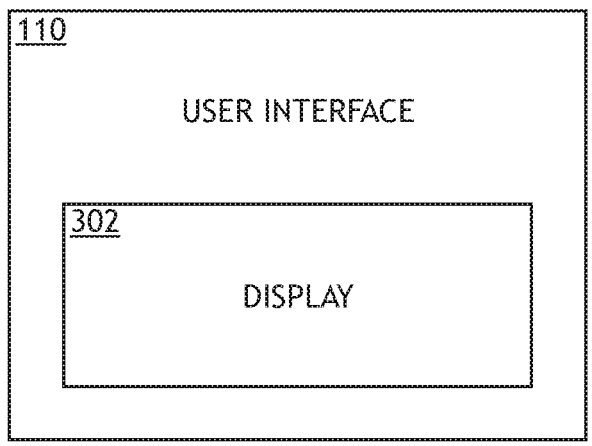
FIG. 3 is a view of an exemplary embodiment of the user interface of FIG. 1 according to the inventive concepts disclosed herein.

Referring now to FIGS. 1-3, an exemplary embodiment of a system 100 according to the inventive concepts disclosed herein is depicted. In some embodiments, the system may include at least one antenna 102, at least one receiver 104, at least one digital pulse analyzer unit (DPAU) 106, at least one computing device 108, at least one user interface 110, and/or at least one computing device 112, some or all of which may be communicatively coupled at any given time. In some embodiments, the at least one DPAU 106, the at least one computing device 108, the at least one user interface 110, and/or the at least one computing device 112 may be implemented as a single computing device or any number of computing devices configured to perform any or all of the operations disclosed throughout.

The antenna 102 may be configured to receive incoming radar signals.

The receiver 104 may be configured to receive radar energy. In some embodiments, the receiver 104 may be configured to receive radar energy between some minimum and maximum frequency range, which may often be between 2 and 18 gigahertz (GHz).

The DPAU 106 may be configured to receive radar energy and digitize the radar energy to produce PDWs, which may be output to the computing device 108.

The at least one computing device 108 may be implemented as any suitable computing device, such as a "back end" radar pulse processing computing device. As shown in FIG. 2, the computing device 108 may include at least one processor 202 and at least one memory 204, some or all of which may be communicatively coupled at any given time. For example, the at least one processor 202 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. The processor 202 may be configured to run various software applications (e.g., software 1000) or computer code stored (e.g., maintained) in a non-transitory computer-readable medium (e.g., memory 204) and configured to execute various instructions or operations. The processor 202 of the computing device 108 may be configured to perform any or all of the operations disclosed throughout.

For example, the processor 202 of the computing device 108 may be configured to: receive radar detection reports (e.g., emitter descriptor words (EDWs)), each radar detection report having a type identification (ID) indicative of a type of radar associated with a given signal detection; for each of the radar detection reports, determine if said radar detection report has a particular type ID associated with a particular existing correlation thread for processing particular radar detection reports having the particular type ID; for each of first radar detection reports determined to have a matching type ID associated with a matching existing correlation thread, add said first radar detection report to a queue (e.g., a priority blocking queue) of said matching existing correlation thread; for each of second radar detection reports determined not to have an associated existing correlation thread, create a new correlation thread and add said second radar detection report to a queue of said new correlation thread; for correlation threads having populated queues, execute at least some of the correlation threads in parallel, wherein execution of each of the at least some of the correlation threads results in at least one of: at least one new radar track or at least one updated existing radar track; and/or output each new radar track and each updated existing radar track.

For example, the processor 202 of the computing device 108 may be further configured to: output each new radar track and each updated existing radar track to a user interface 110 for presentation to a user or to another computing device 112.

For example, the processor 202 of the computing device 108 may be further configured to: place the radar detection reports in a radar detection report queue.

For example, the processor 202 of the computing device 108 may be further configured to: halt each of particular correlation threads having empty queues. For example, the processor 202 of the computing device 108 may be further configured to: reactivate one of the particular correlation threads when said particular correlation thread's queue is repopulated. For example, the processor 202 of the computing device 108 may be further configured to: maintain a hash map of active correlation threads and halted correlation threads such that the halted correlation threads are reusable when the halted correlation threads' queues are repopulated.

For example, the processor 202 of the computing device 108 may be further configured to: execute a predetermined maximum number of the correlation threads in parallel at a given time. For example, the processor 202 of the computing device 108 may be further configured to: place at least one of the correlation threads having the populated queues in a thread queue if a number of the correlation threads having the populated queues exceeds the predetermined maximum number.

For example, the processor 202 of the computing device 108 may be further configured to: for each correlation thread, maintain a sub-list of radar tracks associated with a given type ID. For example, the processor 202 of the computing device 108 may be further configured to: for each correlation thread, compare said radar detection report against the sub-list of radar tracks associated with the given type ID to determine if said radar detection report correlates. For example, the comparison of said radar detection report against the sub-list of radar tracks associated with the given type ID may be faster than a comparison of said radar detection report against a list of all radar tracks. For example, given radar detection reports having the given type ID may be processed in order.

The user interface 110 may be configured to receive each new radar track and each updated existing radar track from the computing device 108 and present such information to a user. For example, the user interface 110 may be or may include a display 302.

The computing device 112 may include elements (e.g., at least one processor 202 and at least one memory 204) similar to and functionality similar to computing device 108. For example, the computing device 112 may be configured to receive each new radar track and each updated existing radar track from the computing device 108 and perform post-processing operations on such information.

Figure 4:
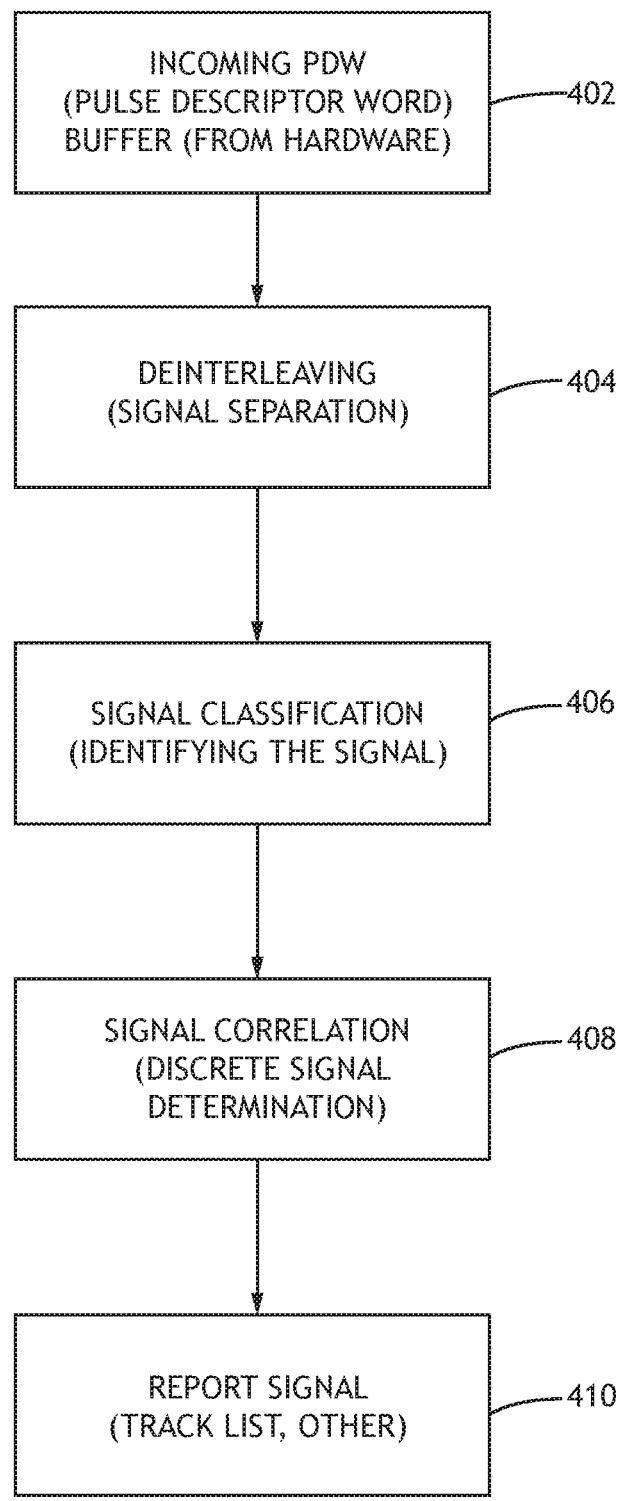
FIG. 4 is a diagram of an exemplary embodiment of a method according to the inventive concepts disclosed herein.

Referring now to FIG. 4, a flow diagram for a method of radar signal processing of some embodiments according to the inventive concepts disclosed herein is depicted. The method may include one or more of the following steps, which, for example, may be performed by the processor 202.

A step 402 may include receiving incoming pulse data (e.g., PDWs) in a PDW buffer. The PDF buffer may contain numerous PDWs. A single PDW may describe a single captured radar pulse, typically, in terms of frequency amplitude, pulse duration, and time of intercept. The PDW buffer may contain pulses from multiple radar signals, which may be jumbled together within the buffer.

A step 404 may include performing deinterleaving (e.g., separating signals). A deinterleaver may take the mix of radar pulses from the PDW buffer and organize and separate the radar pulses into smaller buffers that represent original radars that the pulses originated from.

A step 406 may include performing signal classification (e.g., identifying the signal). Once data is separated into individual radars, the radar can be identified. Commonly identification utilizes a library of known radar types.

A step 408 may include performing signal correlation (e.g., unique signal determination). Signal correlation may determine a uniqueness of a signal within a live environment. For example, there may be more than one radar of a same type active in the environment. Some embodiments may include executing correlation threads in parallel, wherein each correlation thread handles radar detection reports having a particular type ID.

A step 410 may include reporting signals (e.g., reporting a track list). A unique signal list may be provided to an external system (e.g., computing device 112) or to the user interface 110 for presentation to an operator.

In some embodiments, each of the steps 402, 404, 406, 408, 410 may be performed by at least one separate processor of the at least one processor 202. In some embodiments, the steps 402, 404, 406, 408, 410 may be performed by a single processor of the at least one processor 202 or collectively performed by the at least one processor 202.

Further, the method may include any of the operations disclosed throughout.

Referring now to FIGS. 5-9, flow diagrams associated with a method of radar signal processing of some embodiments according to the inventive concepts disclosed herein are depicted. The operations depicted in the flow diagrams may be performed by the processor 202.

Figure 5:
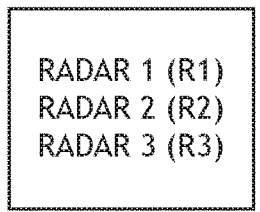
FIG. 5 is a flow diagram associated with a method of radar signal processing of some embodiments according to the inventive concepts disclosed herein.
Figure 5:
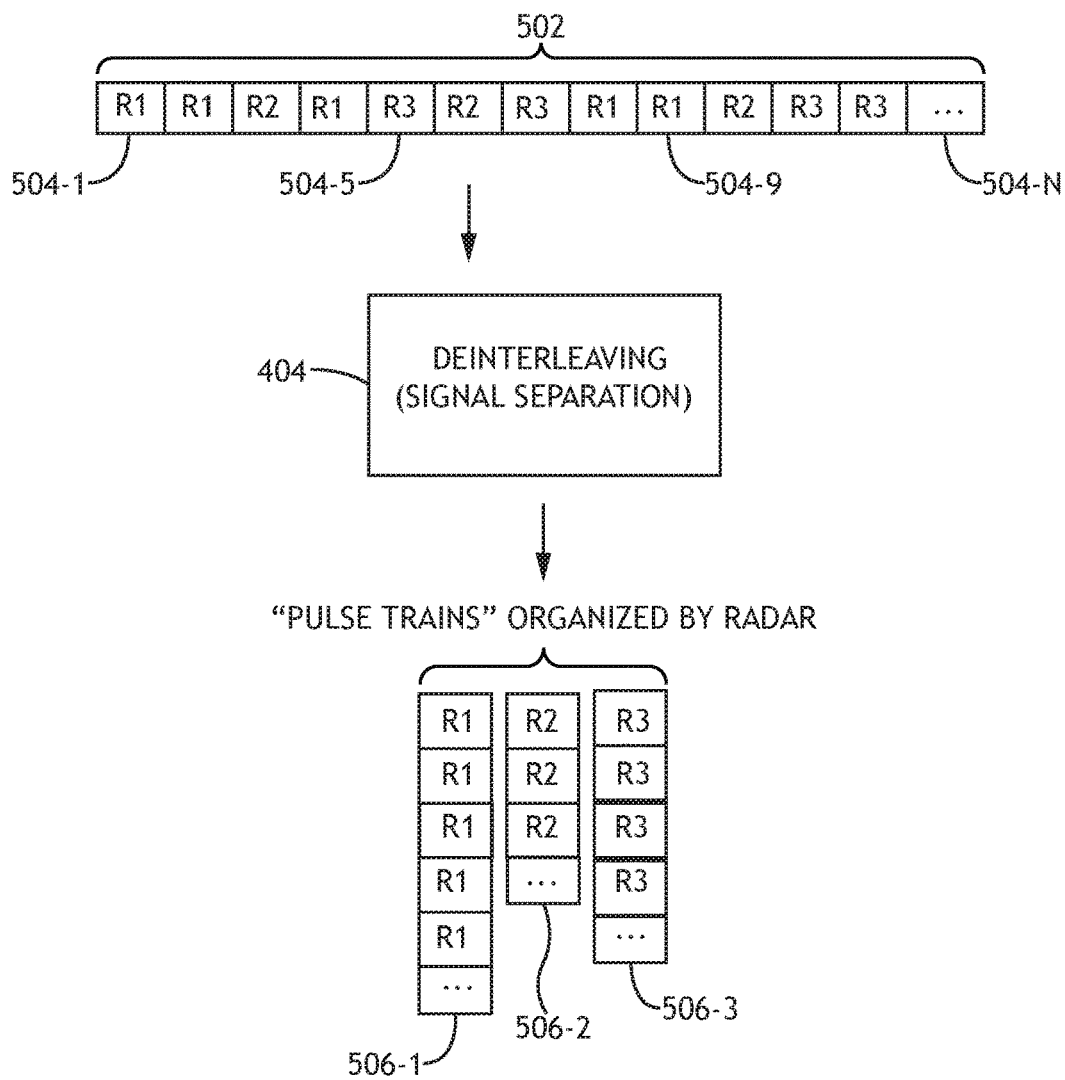

As shown in FIG. 5, a PDW buffer 502 may contain numerous PDWs 504 (e.g., 504-1, . . . , 504-5, . . . , 504-9, . . . , 504-N). The step 404 of deinterleaving may result in pulse trains 506 (e.g., 506-1, 506-2, 506-3) organized by radar. When data is collected the radar pulses (e.g., PDWs 504) are interleaved within the PDW buffer 502. The deinterleaver may separate out the PDW data into individual buffers 506 that each belong to a single radar type.

Figure 6:
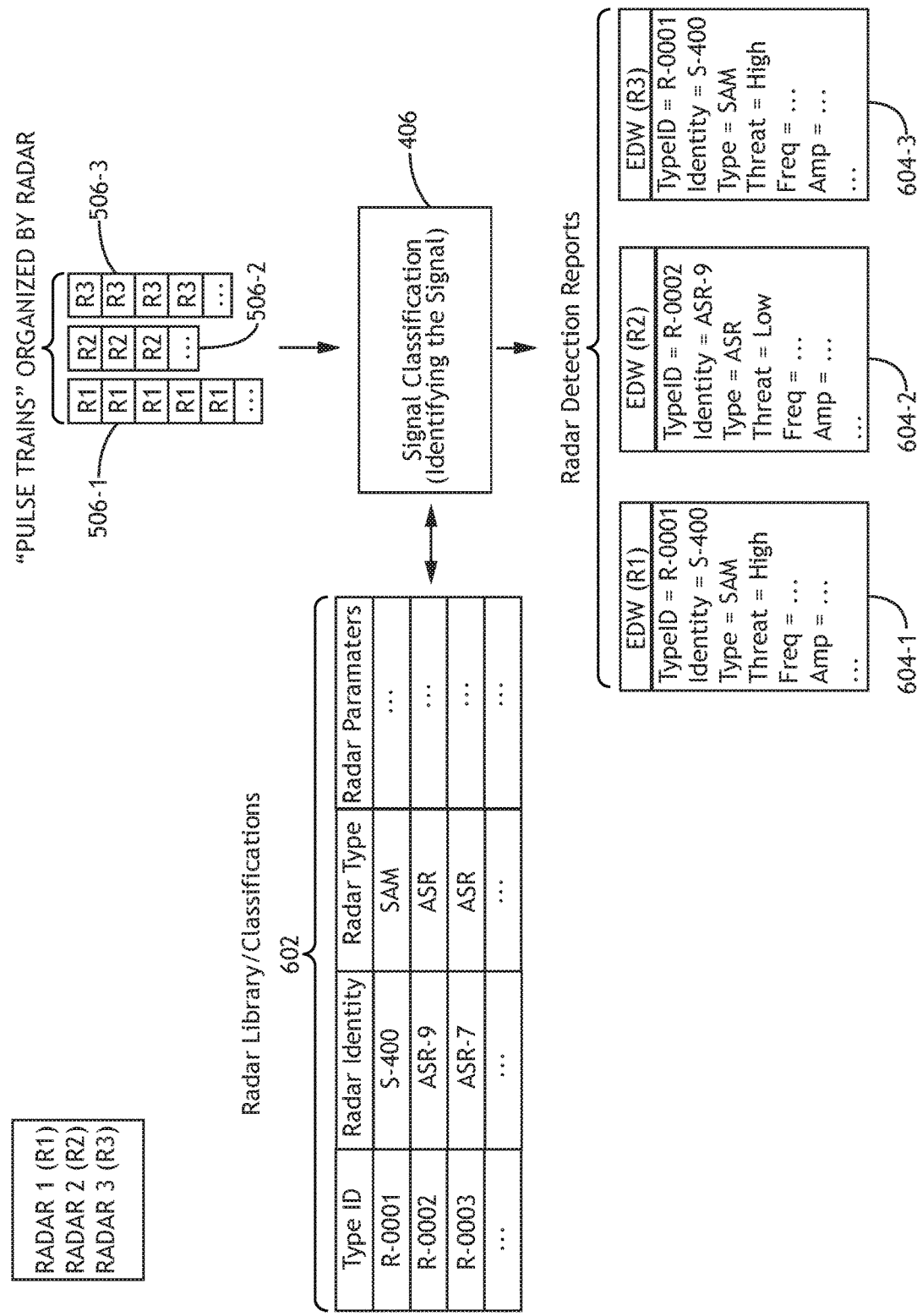
FIG. 6 is a flow diagram associated with a method of radar signal processing of some embodiments according to the inventive concepts disclosed herein.

As shown in FIG. 6, the signal classification (e.g., identification) phase provides a name to the radar signal. Identification may utilize a library 602 of predefined signals with known specific parameters. As part of this phase, a modification will be made to add a "type ID" to the list of known radar types. The library 602 may be a list of known radar types and/or classifications and associated parameters. The type ID can be used to allow for parallel correlation. This type ID may be passed along with the radar name and other parameters in radar detection reports (e.g., EDWs) during the identification process. The signal classification (e.g., identification) phase produces the radar detection reports, each of which identifies and describes the radar that has been detected.

Figure 7:
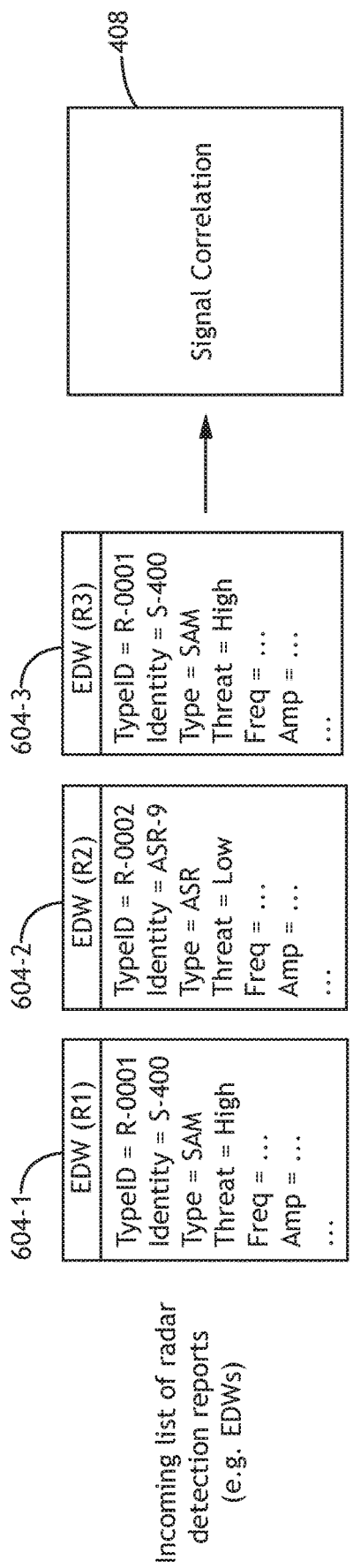
FIG. 7 is a flow diagram associated with a method of radar signal processing of some embodiments according to the inventive concepts disclosed herein.

As shown in FIG. 7, the radar detection reports (e.g., EDWs) are passed to the signal correlation step 408.

Figure 8:
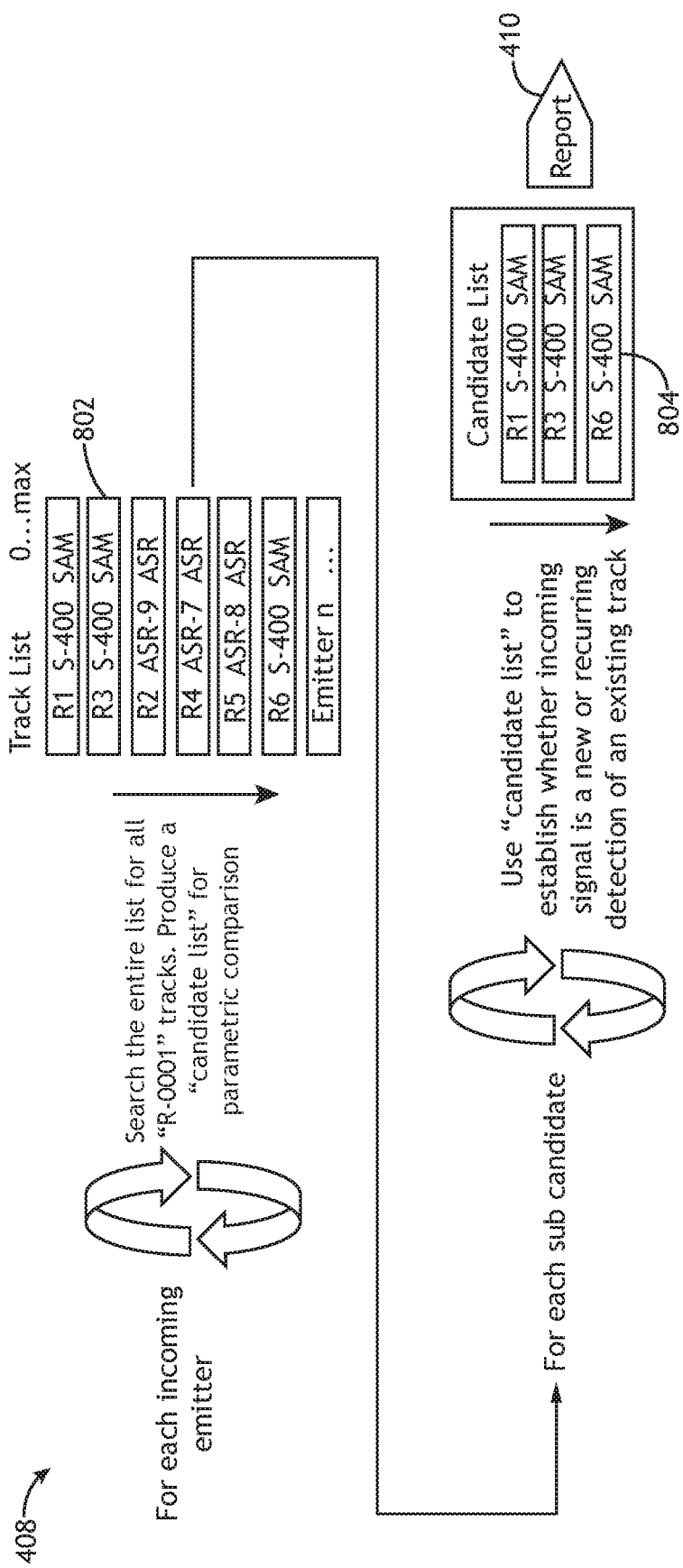
FIG. 8 is a flow diagram associated with a method of radar signal processing of some embodiments according to the inventive concepts disclosed herein.

As shown in FIG. 8, signal correlation 408 attempts to differentiate discrete radar in the environment. The system will detect radars of the same type (e.g., identification) but they may not be the same physical radar within the environment. As shown in FIG. 8, existing single-threaded signal correlation may include searching an entire track list 802 for all R-1 tracks and producing a candidate list 804 for parametric comparison. For each sub candidate, the candidate list 804 may be used to establish whether an incoming signal is a new detection or a recurring detection of an existing track. In response to performance of the signal correlation, the processor may report a new radar track or an updated existing radar track.

Figure 9:
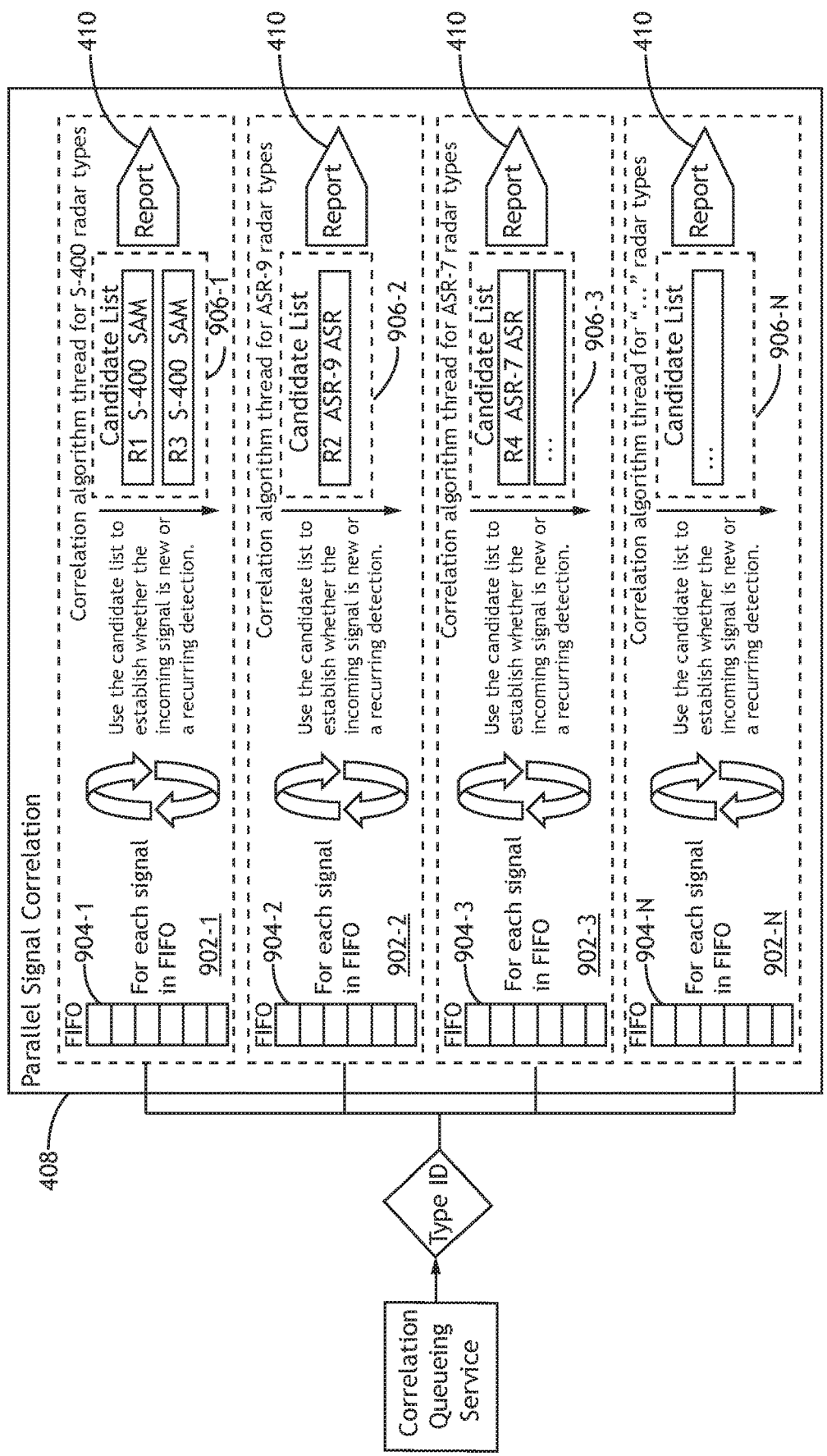
FIG. 9 is a flow diagram associated with a method of radar signal processing of some embodiments according to the inventive concepts disclosed herein.

As shown in FIG. 9, in some embodiments, signal correlation 408 may be performed in parallel. Parallel correlation may use the type ID added in the signal identification phase 406. This type ID can be used to create unique correlation threads 902 (e.g., 902-1, 902-2, 902-3, . . . 902-N). Each correlation thread 902 may handle radars of a same type (e.g., having the same type ID). Because the threads 902 will only handle radars of the same type, the threads 902 themselves can operate safely in parallel without needing to synchronize the correlation process between the other threads 902. Additionally, each thread 902 can permanently maintain its own sub-list (e.g., candidate list 906 (e.g., 906-1, 906-2, 906-3, . . . 906-N)) of tracks which can remove a need to re-query or search the entire track list (which covers all radar types) to find candidates each signal correlation needs to be performed. The type ID may be used as a unique hash to route incoming signal detections or radar detection reports to a corresponding correlation thread 902 created to handle that type of radar associated with the particular type ID. In some embodiments, the correlation threads 902 do not exist until a radar of a given type first arrives. Once created, a correlation thread 902 continues to exist but may be deactivated or placed in a sleep state if not in use. Each correlation thread 902 may handle correlation processing for a single radar type. Each correlation thread 902 for a given radar type can maintain a reference to a list of radar targets of that type. This can reduce a need to search an entire list for every signal correlation. Because each correlation thread 902 only processes radars of a same type, there may be no need to perform any complex thread synchronization, and each correlation thread 902 can operate independently. For each correlation thread 902, the sub-list (e.g., candidate list 906 (e.g., 906-1, 906-2, 906-3, . . . 906-N)) of tracks can be used to establish whether the incoming signal is a new discrete radar or a recurring detection of a tracked radar. In response to performance of the signal correlation 408 for any given correlation thread 902, the processor 202 may report 410 a new radar track or an updated existing radar track.

Referring now to FIGS. 10-16, diagrams associated with exemplary software 1000 for parallel correlation processing of some embodiments according to the inventive concepts disclosed herein are depicted. The software 1000 depicted by the diagrams may be executed by the processor 202.

Figure 10:
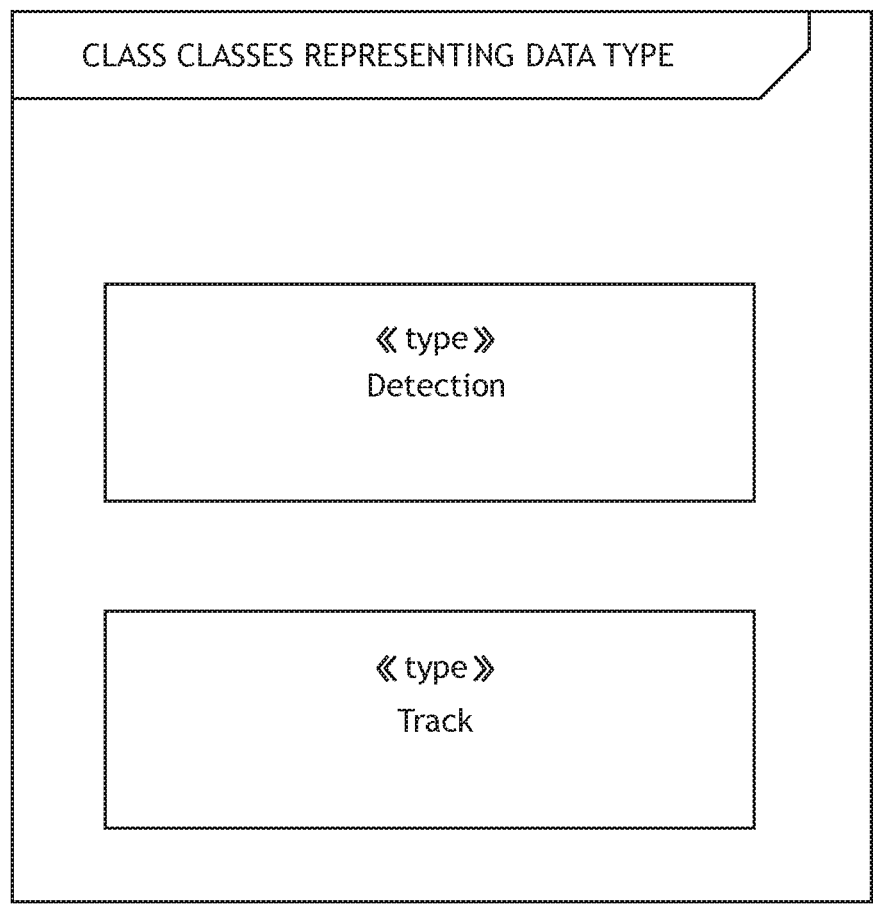
FIG. 10 is a diagram of data type components, which may be used to implement parallel correlation software of some embodiments, according to the inventive concepts disclosed herein.

As shown in FIG. 10, a diagram of data type components, which may be used to implement the parallel correlation software 1000, is depicted.

A radar detection report (e.g., EDW) may be a report that represents a radar detection. An EDW may be a report on a radar detected within an environment. "Detection" is a data structure/class that encapsulates the information related to reporting on the detected radar. This information may include the identity of the radar, the parametrics associated with the radar and more. This structure may also include a type ID representing a unique type of radar.

A "Track" may be created when the system establishes a distinguishable radar that should be reported to an end user or another computing device. The end user may view a list of "Radar Tracks", which may provide the end user or other computing device with situational awareness.

Figure 11:
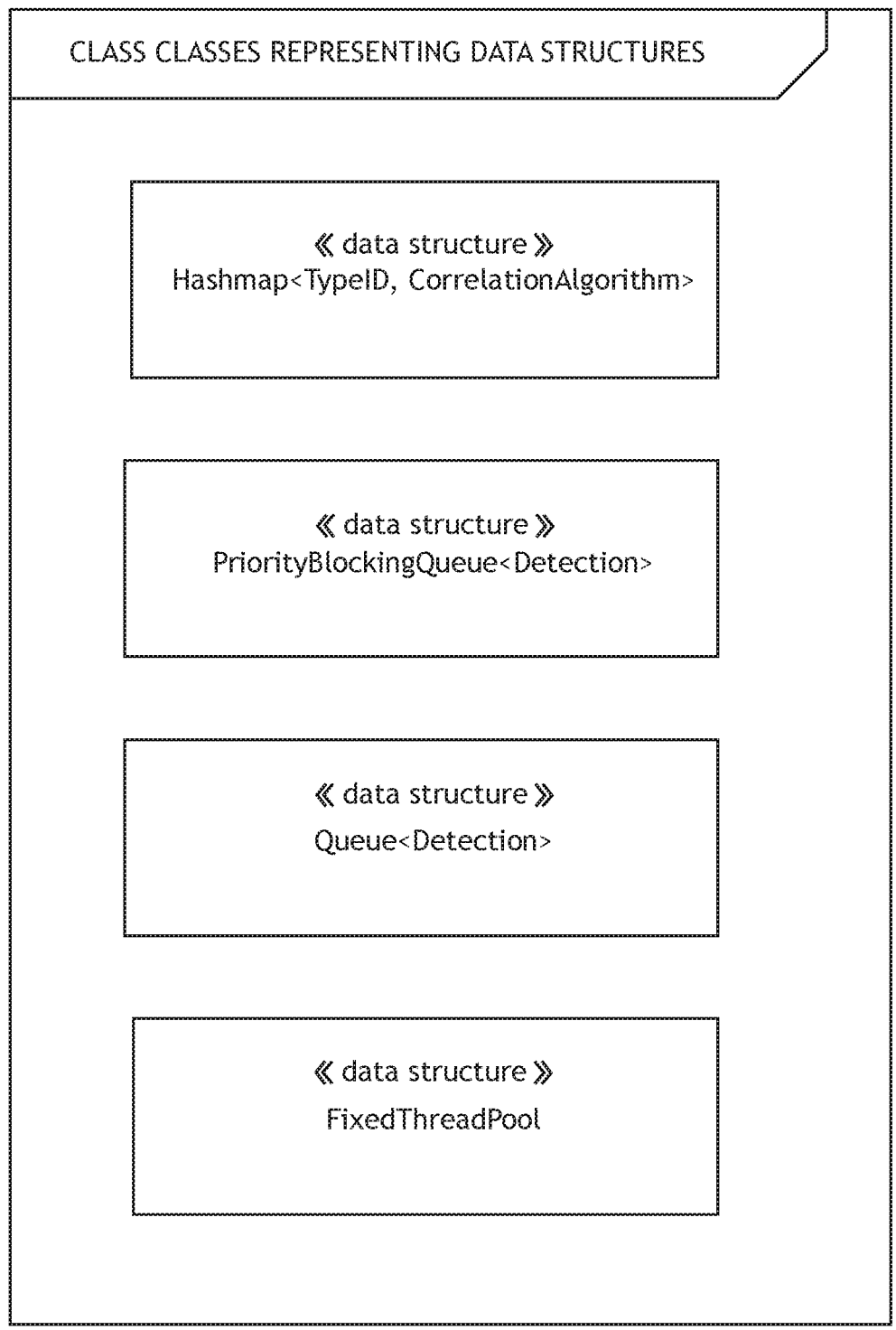
FIG. 11 is a diagram of data structure components, which may be used to implement parallel correlation software of some embodiments, according to the inventive concepts disclosed herein.

As shown in FIG. 11, a diagram of data structure components, which may be used to implement the parallel correlation software 1000, is depicted.

"HashMap<TypeID, CorrelationAlgorithm>": A hash map is a common programming data structure. A hash map contains a set of "key/value" relationships. The "key" is used to retrieve an associated "value" or even a set of "values". In this case, the hash map will use the "TypeID" as a key and the "CorrelationAlgorithm" thread as a value. This data structure stores the threads that have been created for processing specific radar types.

"PriorityBlockingQueue<Detection>": A priority blocking queue is a data structure. A queue is a first in, first out (FIFO) structure in which elements are removed from the structure in the order they were placed in the structure. A "blocking" queue is a queue in which the data removal function blocks (e.g., does not return) until data is available in the queue. A priority queue allows higher priority elements to move up in line to be removed from the stack. Priority should be defined by comparison routines. The "PriorityBlockingQueue" will hold incoming radar Detection data types for processing. The threat level of the incoming radar Detection will move the item up in the queue if multiple elements are being processed. In some embodiments, this data structure does not need to be a priority data structure. In some embodiments, this data structure can be any FIFO data structure that is blocking.

"Queue<Detection>": A queue is a first in, first out (FIFO) structure in which elements are removed from the structure in the order they were placed in the structure. This queue contains Detection data types.

"FixedThreadPool": A fixed thread pool is a data structure that acts as an unbounded queue containing a list of threads to be executed. The fixed thread pool ensures that only n threads are executing at a same time to prevent saturation of the processor. The number n is predefined within the code to be whatever the system can allow while leaving sufficient processing capability for other threads of execution.

Figure 12:
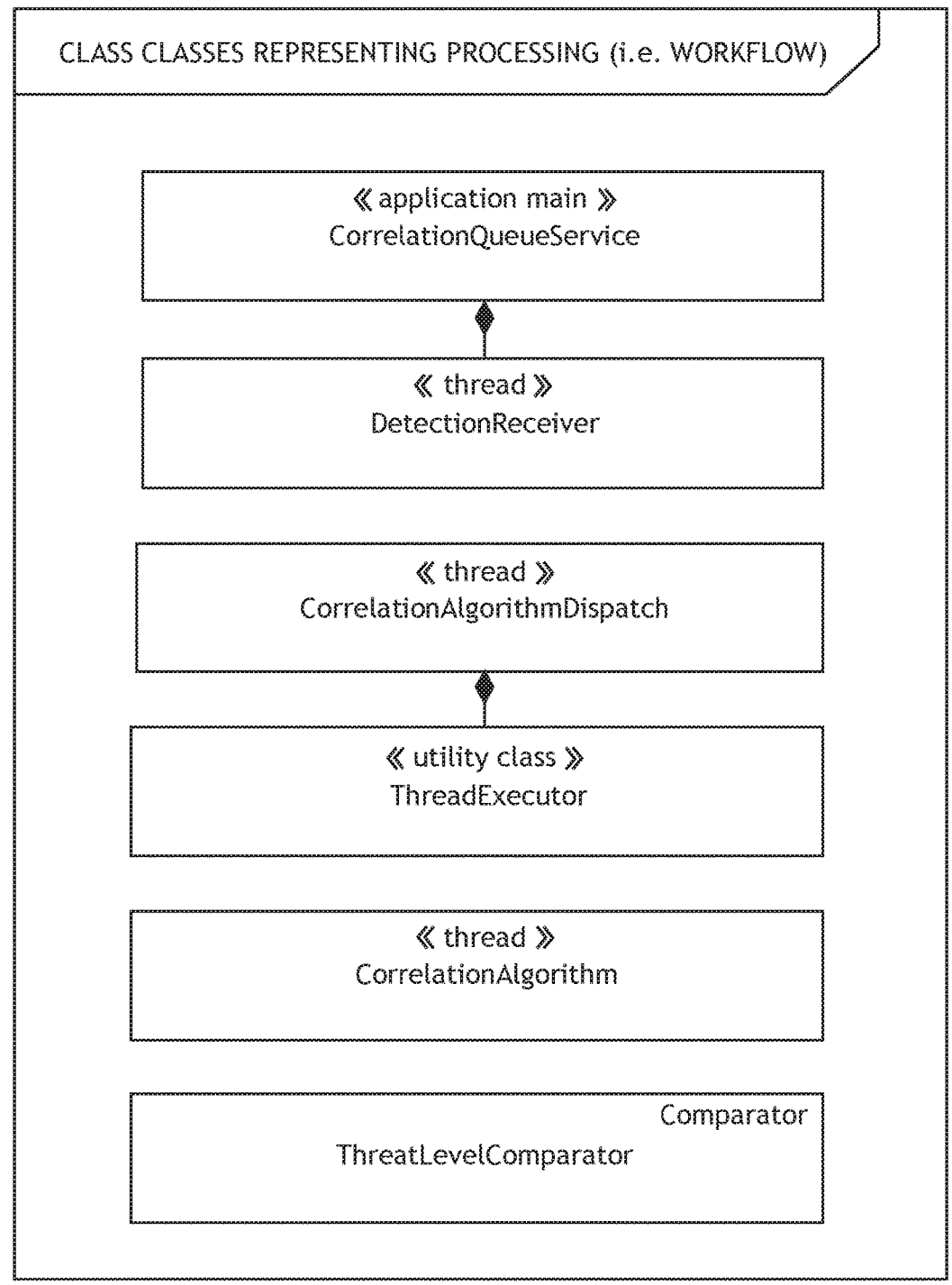
FIG. 12 is a diagram of data processing components, which may be used to implement parallel correlation software of some embodiments, according to the inventive concepts disclosed herein.

As shown in FIG. 12, a diagram of data processing components, which may be used to implement the parallel correlation software 1000, is depicted.

"CorrelationQueueService": This is the top level component for declaring, starting and executing all threads of execution that exist within this process. This process could exist within a monolithic software application or it could exist as a standalone microservice with published application programmer interfaces (APIs).

"DetectionReceiver": The DetectionReceiver acts as the "producer" in a standard "producer/consumer" threading model. As "Detection" types are received from deinterleaving/identification processing, the "Detection" types are placed in the BlockingQueue data structure. Receiving the "Detection" data type and placing it on the blocking queue is the sole responsibility of this thread.

"CorrelationAlgorithmDispatch": The "CorrelationAlgorithm Dispatch" acts as both a "consumer" in a standard "producer/consumer" threading model and as a dispatch mechanism. This houses and uses the "ThreadExecutor" utility to start and maintain the "CorrelationAlgorithm" threads.

"ThreadExecutor": The "ThreadExecutor" is a utility class that executes the new Thread and houses the "FixedThreadPool" data structure.

"CorrelationAlgorithm": The "CorrelationAlgorithm" is the engine that actually performs the correlation work. This is the piece that is running in parallel processing the incoming radar detections and performing real radar signal processing.

"ThreatLevelComparator": This is a simple utility that compares two Detection data types by their threat level to determine which Detection type should be first in priority.

Figure 13:
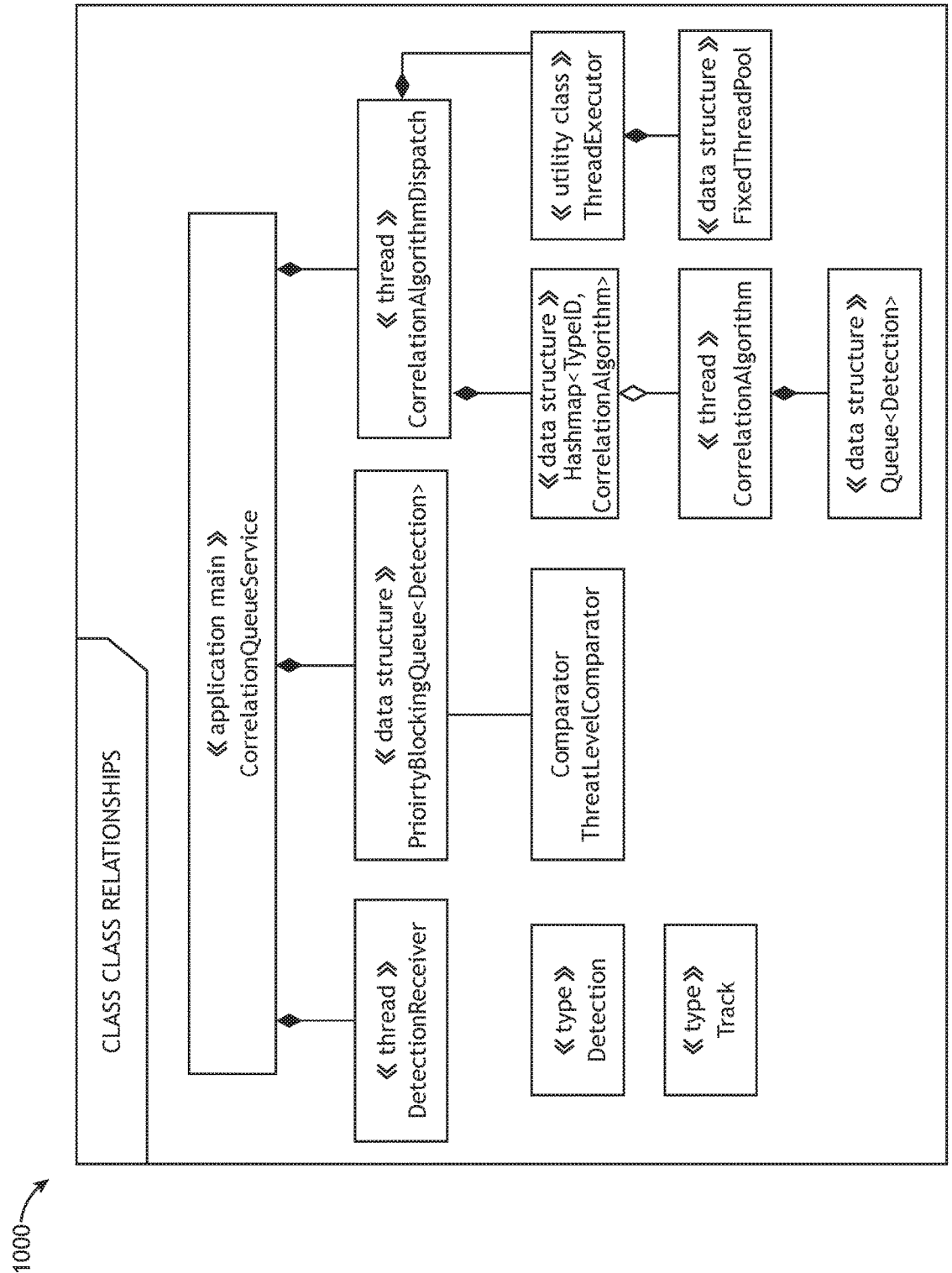
FIG. 13 is a diagram that shows a relationship between components of the parallel correlation software of some embodiments according to the inventive concepts disclosed herein.

FIG. 13 is a diagram that shows a relationship between components of the software 1000 in Unified Modelling Language (UML) format.

To facilitate parallel radar signal correlation, the type ID may be used as a form of unique ID that may be generated to uniquely identify matching library entries signal identification/classification. The signal identification/classification stage should associate the type ID of the matching entry to the outgoing signal detection.

Figure 14:
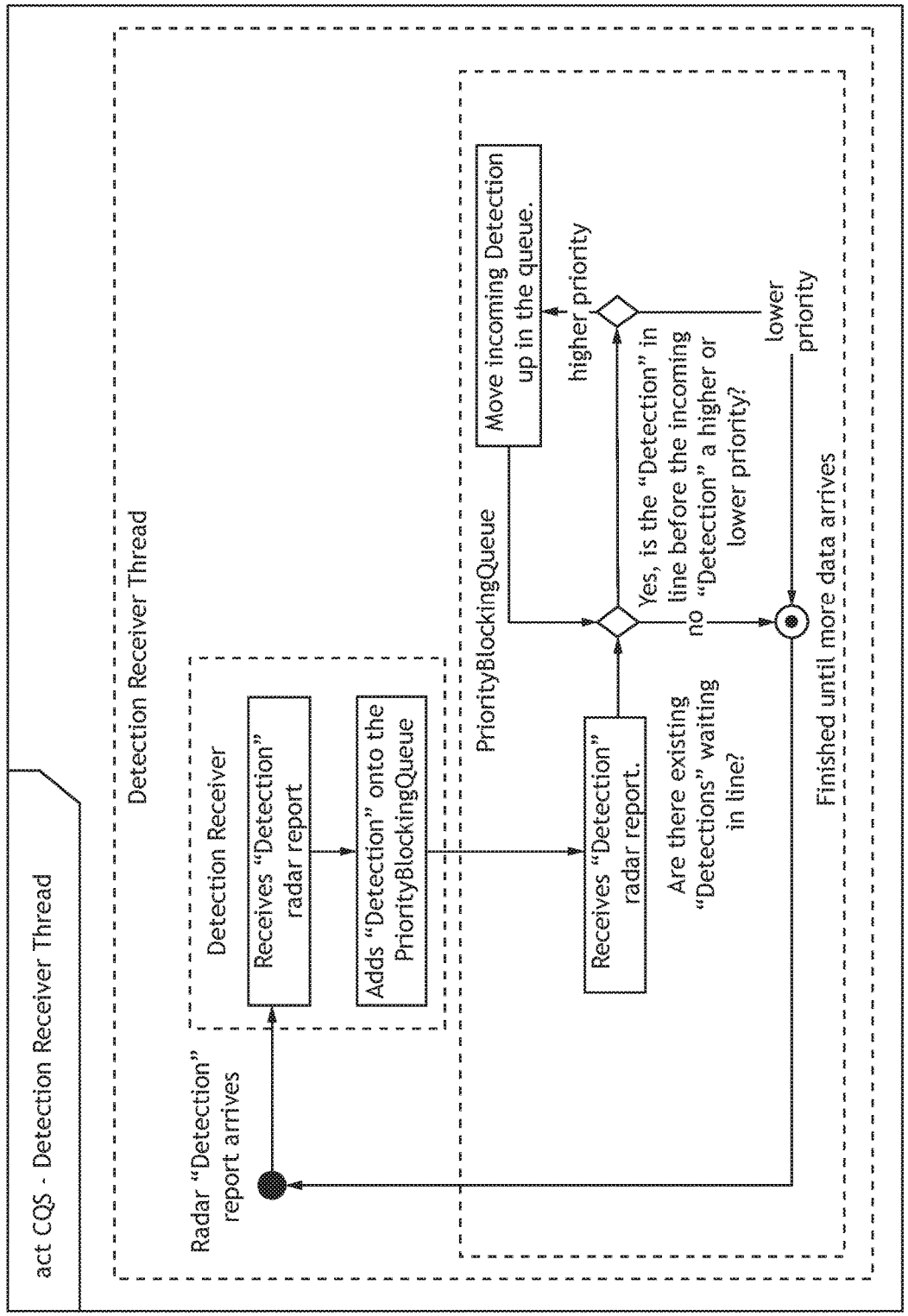
FIG. 14 is an activity diagram for a correlation queueing service of parallel correlation software of some embodiments according to the inventive concepts disclosed herein.

FIG. 14 is a UML activity diagram for a correlation queueing service of the software 1000. Detections that have been identified/classified and contain a type ID are routed to a correlation queuing service. The correlation queuing services acts as the central mechanism to manage the receipt and parallel correlation of received signal detections. The correlation queueing service is handled within the Detection Receiver Thread component. The Detection Receiver Thread acts as a producer thread, receiving radar detection reports and placing them on the queue to be consumed by the correlation threads (e.g., correlation algorithm threads) that will run in parallel to process the data.

Figure 15:
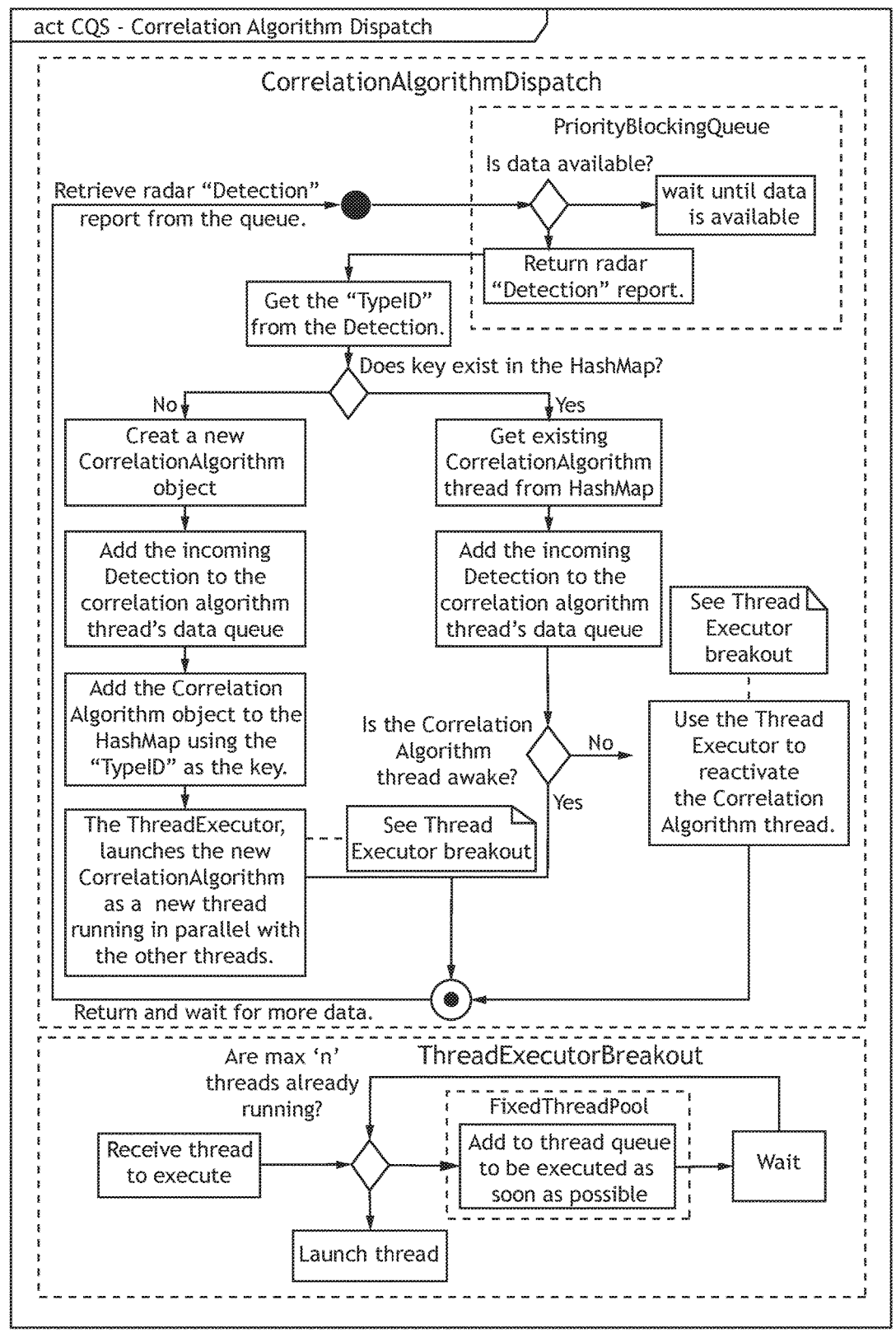
FIG. 15 is an activity diagram for a "CorrelationAlgorithmDispatch" of parallel correlation software of some embodiments according to the inventive concepts disclosed herein.

FIG. 15 is a UML activity diagram for a "CorrelationAlgorithmDispatch" of the software 1000. The "CorrelationAlgorithm Dispatch" component is a process thread which acts on receipt of an arriving signal detection on the queue. The thread will block on an empty queue. When a signal detection is received, the dispatch thread removes the detection from the queue. The unique type ID is retrieved from the signal detection and utilized to create a correlation thread (e.g., "CorrelationAlgorithm" thread). The CorrelationAlgorithm thread will be stored by the unique type ID within a HashMap for future retrieval.

The ThreadExecutor utilizes a fixed thread pool. The fixed thread pool operates on an unbounded queue and will run a user specified number of the correlation threads (e.g., CorrelationAlgorithm threads) in parallel. Each correlation thread will only run until its queue empties.

When a correlation thread (e.g., CorrelationAlgorithm thread) completes processing all elements on its queue, the thread will halt. But, the CorrelationAlgorithmDispatch maintains the actual component within the HashMap so it can be reutilized and relaunched should more data arrive. Should another signal arrive, that matches an existing CorrelationAlgorithm thread's type ID, it will be added to the existing CorrelationAlgorithm thread's queue and the CorrelationAlgorithm thread once again placed onto the thread pool executor. Should the aforementioned signal arrive while the correlation thread (e.g., correlation algorithm thread) is already executing, it will simply be placed on the queue where it awaits processing.

Figure 16:
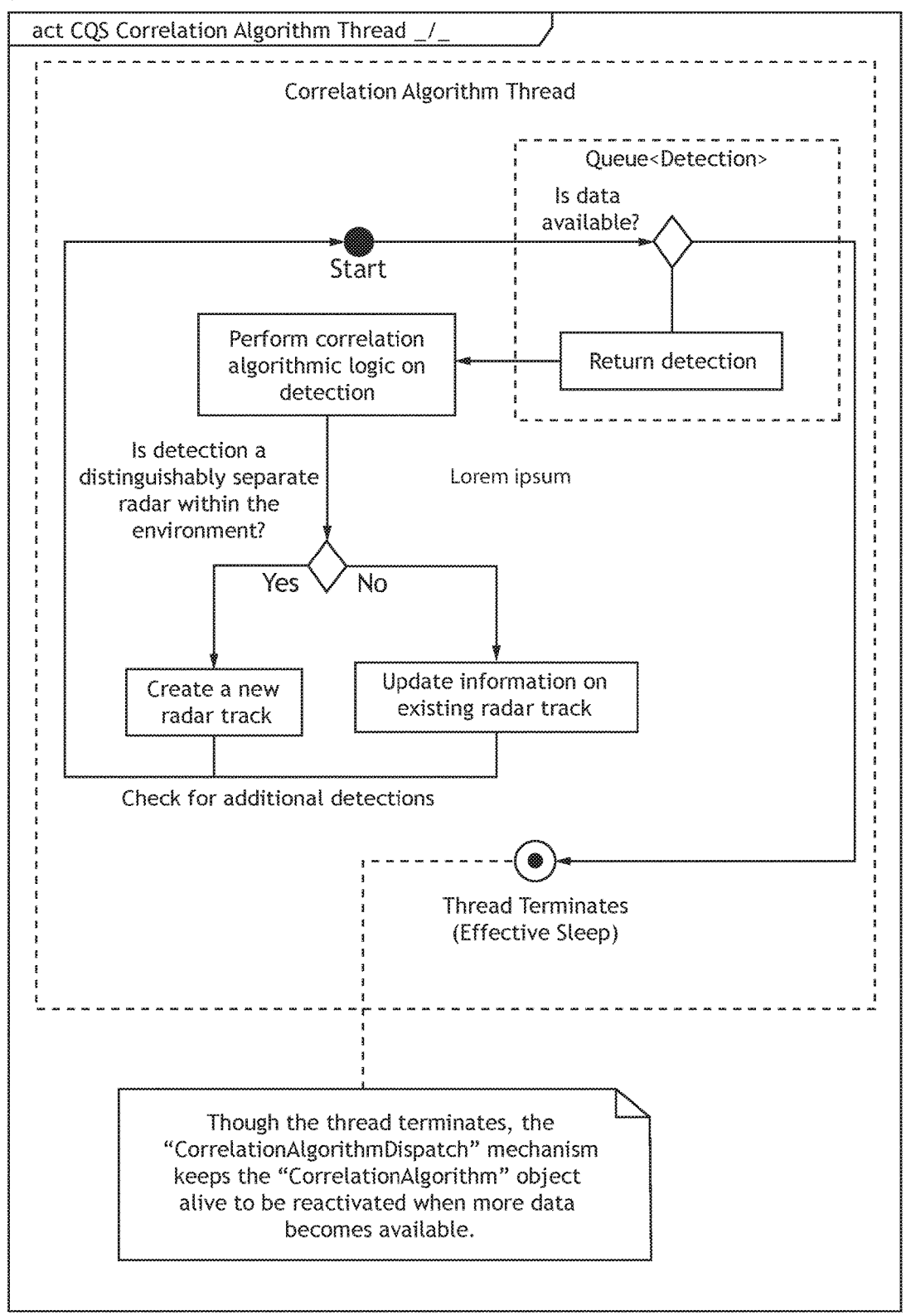
FIG. 16 is an activity diagram for a correlation thread of parallel correlation software of some embodiments according to the inventive concepts disclosed herein.

FIG. 16 is a UML activity diagram for a correlation thread (e.g., CorrelationAlgorithm Thread) of the software 1000. The correlation thread (e.g., CorrelationAlgorithm Thread) component is a process thread which is dispatched by CorrelationAlgorithmDispatch. The component supports its own queue to house new incoming detections. One correlation thread (e.g., CorrelationAlgorithm Thread) per unique type ID will be created. In some embodiments, by virtue of the type ID, this queue may only contain signal detections that could possibly correlate, and this allows for efficient operation of each correlation thread (e.g., CorrelationAlgorithm Thread). An advantage of making one correlation thread per unique type ID is that the correlation thread can permanently maintain a sub-list of tracks that are relevant only for correlation to the incoming detection. This can speed up the comparison between incoming signal detection and existing tracks by skipping the need to keep retrieving the same data every time a new detection arrives. Another advantage of making one correlation thread per unique type ID is that incoming detections of the same radar identification/classification are processed in order, and this can be important for algorithms that utilize direction finding values assigned to incoming signal detections. After the correlation thread (e.g., CorrelationAlgorithm Thread) has been created, it will process the first element within its internal blocking queue. When a CorrelationAlgorithm thread completes all items in the queue, the thread will exit, but the correlation thread (e.g., CorrelationAlgorithm Thread) and its queue will live on within CorrelationAlgorithmDispatch's HashMap.

Figure 17:
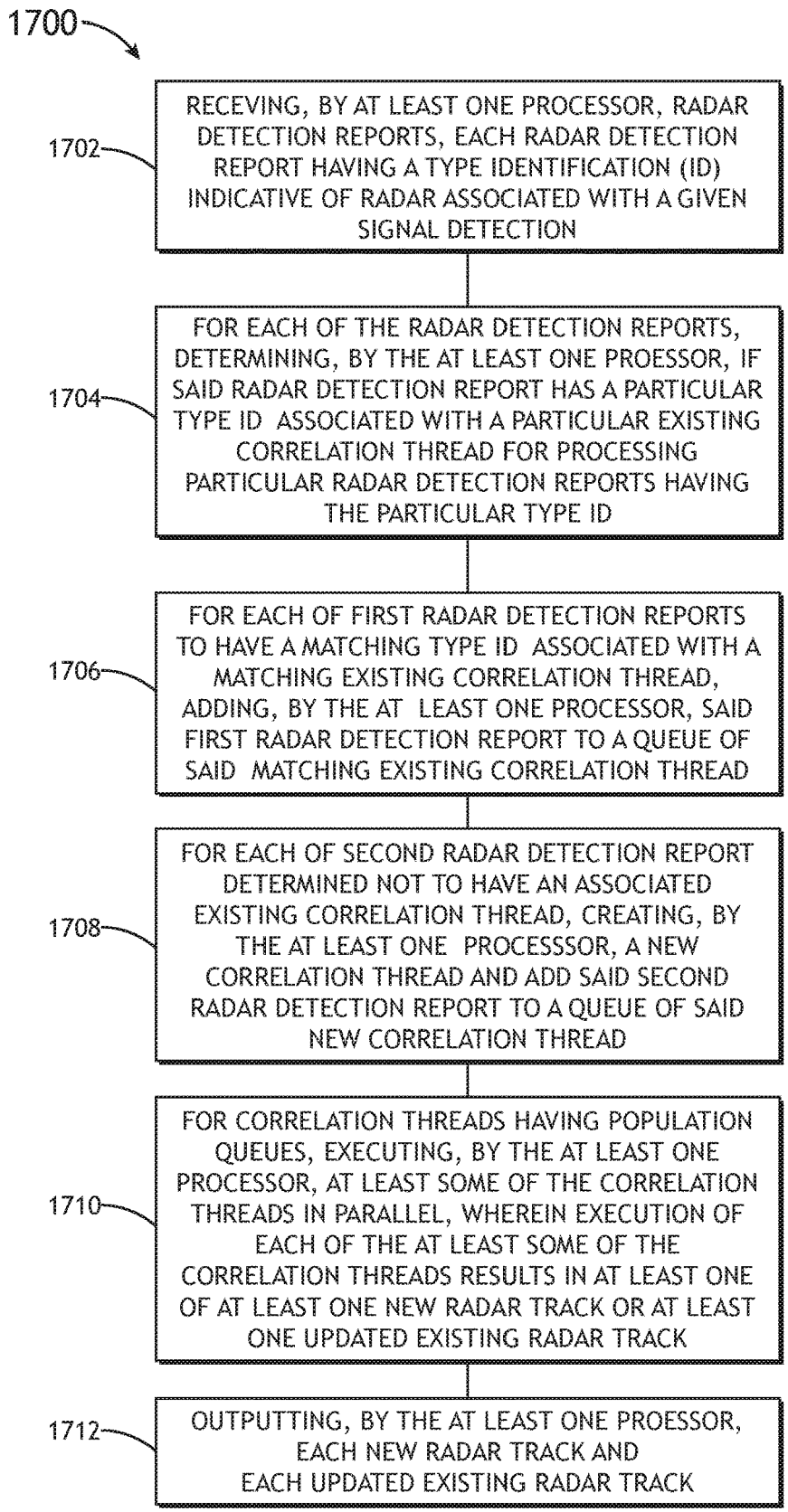
FIG. 17 is a diagram of an exemplary embodiment of a method according to the inventive concepts disclosed herein.

Referring now to FIG. 17, an exemplary embodiment of a method 1700 according to the inventive concepts disclosed herein may include one or more of the following steps. Additionally, for example, some embodiments may include performing one or more instances of the method 1700 iteratively, concurrently, and/or sequentially. Additionally, for example, at least some of the steps of the method 1700 may be performed in parallel and/or concurrently. Additionally, in some embodiments, at least some of the steps of the method 1700 may be performed non-sequentially.

A step 1702 may include receiving, by at least one processor, radar detection reports, each radar detection report having a type identification (ID) indicative of a type of radar associated with a given signal detection.

A step 1704 may include for each of the radar detection reports, determining, by the at least one processor, if said radar detection report has a particular type ID associated with a particular existing correlation thread for processing particular radar detection reports having the particular type ID.

A step 1706 may include for each of first radar detection reports determined to have a matching type ID associated with a matching existing correlation thread, adding, by the at least one processor, said first radar detection report to a queue of said matching existing correlation thread.

A step 1708 may include for each of second radar detection reports determined not to have an associated existing correlation thread, creating, by the at least one processor, a new correlation thread and add said second radar detection report to a queue of said new correlation thread.

A step 1710 may include for correlation threads having populated queues, executing, by the at least one processor, at least some of the correlation threads in parallel, wherein execution of each of the at least some of the correlation threads results in at least one of at least one new radar track or at least one updated existing radar track.

A step 1712 may include outputting, by the at least one processor, each new radar track and each updated existing radar track.

Further, the method 1700 may include any of the operations disclosed throughout.

As will be appreciated from the above, embodiments of the inventive concepts disclosed herein may be directed to a system and a method configured to perform signal correlation utilizing parallel processing.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
    a back end radar pulse processing computing device, comprising:
        at least one processor configured to:
            receive radar detection reports, each radar detection report having a type identification (ID) indicative of a type of radar associated with a given signal detection;
            for each of the radar detection reports, determine if said radar detection report has a particular type ID associated with a particular existing correlation thread for processing particular radar detection reports having the particular type ID;
            for each of first radar detection reports determined to have a matching type ID associated with a matching existing correlation thread, add said first radar detection report to a queue of said matching existing correlation thread;
            for each of second radar detection reports determined not to have an associated existing correlation thread, create a new correlation thread and add said second radar detection report to a queue of said new correlation thread;
            for correlation threads having populated queues, execute at least some of the correlation threads in parallel, wherein execution of each of the at least some of the correlation threads results in at least one of: at least one new radar track or at least one updated existing radar track; and
            output each new radar track and each updated existing radar track,
            wherein each correlation thread has a priority blocking queue; and
    a digital pulse analyzer unit (DPAU) communicatively coupled to the back end radar pulse processing computing device, wherein the DPAU is configured to: receive radar energy; digitize the radar energy to produce pulse descriptor words (PDWs); and output the PDWs to the back end radar pulse processing computing device.

2. The system of claim 1, wherein the at least one processor is further configured to output each new radar track and each updated existing radar track to a user interface for presentation to a user or to another computing device.

3. The system of claim 1, wherein the at least one processor is further configured to place the radar detection reports in a radar detection report queue.

4. The system of claim 1, wherein the radar detection reports are emitter descriptor words (EDWs).

5. The system of claim 1, wherein the at least one processor is further configured to: halt each of particular correlation threads having empty queues.

6. The system of claim 5, wherein the at least one processor is further configured to: reactivate one of the particular correlation threads when said particular correlation thread's queue is repopulated.

7. The system of claim 5, wherein the at least one processor is further configured to: maintain a hash map of active correlation threads and halted correlation threads such that the halted correlation threads are reusable when the halted correlation threads' queues are repopulated.

8. The system of claim 1, wherein the at least one processor is further configured to: execute a predetermined maximum number of the correlation threads in parallel at a given time.

9. The system of claim 8, wherein the at least one processor is further configured to: place at least one of the correlation threads having the populated queues in a thread queue if a number of the correlation threads having the populated queues exceeds the predetermined maximum number.

10. The system of claim 1, wherein the at least one processor is further configured to: for each correlation thread, maintain a sub-list of radar tracks associated with a given type ID.

11. The system of claim 10, wherein the at least one processor is further configured to: for each correlation thread, compare said radar detection report against the sub-list of radar tracks associated with the given type ID to determine if said radar detection report correlates.

12. The system of claim 11, wherein the comparison of said radar detection report against the sub-list of radar tracks associated with the given type ID is faster than a comparison of said radar detection report against a list of all radar tracks.

13. The system of claim 11, wherein given radar detection reports having the given type ID are processed in order.

14. A method, comprising:
    receiving, by at least one processor of a back end radar pulse processing computing device, radar detection reports, each radar detection report having a type identification (ID) indicative of a type of radar associated with a given signal detection;
    for each of the radar detection reports, determining, by the at least one processor, if said radar detection report has a particular type ID associated with a particular existing correlation thread for processing particular radar detection reports having the particular type ID;
    for each of first radar detection reports determined to have a matching type ID associated with a matching existing correlation thread, adding, by the at least one processor, said first radar detection report to a queue of said matching existing correlation thread;
    for each of second radar detection reports determined not to have an associated existing correlation thread, creating, by the at least one processor, a new correlation thread and add said second radar detection report to a queue of said new correlation thread;
    for correlation threads having populated queues, executing, by the at least one processor, at least some of the correlation threads in parallel, wherein execution of each of the at least some of the correlation threads results in at least one of at least one new radar track or at least one updated existing radar track;

outputting, by the at least one processor, each new radar track and each updated existing radar track, wherein each correlation thread has a priority blocking queue;

receiving, by a digital pulse analyzer unit (DPAU) communicatively coupled to the back end radar pulse processing computing device, radar energy;

digitizing, by the DPAU, the radar energy to produce pulse descriptor words (PDWs); and outputting, by the DPAU, the PDWs to the back end radar pulse processing computing device.

15. A system, comprising:
a back end radar pulse processing computing device, comprising:
  at least one processor configured to:
    receive radar detection reports, each radar detection report having a type identification (ID) indicative of a type of radar associated with a given signal detection;
    for each of the radar detection reports, determine if said radar detection report has a particular type ID associated with a particular existing correlation thread for processing particular radar detection reports having the particular type ID;
    for each of first radar detection reports determined to have a matching type ID associated with a matching existing correlation thread, add said first radar detection report to a queue of said matching existing correlation thread;
    for each of second radar detection reports determined not to have an associated existing correlation thread, create a new correlation thread and add said second radar detection report to a queue of said new correlation thread;
    for correlation threads having populated queues, execute at least some of the correlation threads in parallel, wherein execution of each of the at least some of the correlation threads results in at least one of: at least one new radar track or at least one updated existing radar track;
    output each new radar track and each updated existing radar track;
    halt each of particular correlation threads having empty queues; and
    maintain a hash map of active correlation threads and halted correlation threads such that the halted correlation threads are reusable when the halted correlation threads' queues are repopulated; and
  a digital pulse analyzer unit (DPAU) communicatively coupled to the back end radar pulse processing computing device, wherein the DPAU is configured to: receive radar energy; digitize the radar energy to produce pulse descriptor words (PDWs); and output the PDWs to the back end radar pulse processing computing device.

16. A system, comprising:
a back end radar pulse processing computing device, comprising:
  at least one processor configured to:
    receive radar detection reports, each radar detection report having a type identification (ID) indicative of a type of radar associated with a given signal detection;
    for each of the radar detection reports, determine if said radar detection report has a particular type ID associated with a particular existing correlation thread for processing particular radar detection reports having the particular type ID;
    for each of first radar detection reports determined to have a matching type ID associated with a matching existing correlation thread, add said first radar detection report to a queue of said matching existing correlation thread;
    for each of second radar detection reports determined not to have an associated existing correlation thread, create a new correlation thread and add said second radar detection report to a queue of said new correlation thread;
    for correlation threads having populated queues, execute at least some of the correlation threads in parallel, wherein execution of each of the at least some of the correlation threads results in at least one of: at least one new radar track or at least one updated existing radar track;
    output each new radar track and each updated existing radar track;
    execute a predetermined maximum number of the correlation threads in parallel at a given time; and
    place at least one of the correlation threads having the populated queues in a thread queue if a number of the correlation threads having the populated queues exceeds the predetermined maximum number; and
  a digital pulse analyzer unit (DPAU) communicatively coupled to the back end radar pulse processing computing device, wherein the DPAU is configured to: receive radar energy; digitize the radar energy to produce pulse descriptor words (PDWs); and output the PDWs to the back end radar pulse processing computing device.

* * * * *